(12) United States Patent
Hahn et al.

(10) Patent No.: US 9,014,714 B2
(45) Date of Patent: Apr. 21, 2015

(54) METHOD OF PROVIDING LOCATION PRIVACY

(75) Inventors: Gene Beck Hahn, Gyeonggi-do (KR); Ki Seon Ryu, Gyeonggi-do (KR); Yong Ho Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 12/497,342

(22) Filed: Jul. 2, 2009

(65) Prior Publication Data
US 2010/0004002 A1 Jan. 7, 2010

Related U.S. Application Data

(60) Provisional application No. 61/080,696, filed on Jul. 15, 2008.

(30) Foreign Application Priority Data

Jul. 3, 2008 (KR) .................. 10-2008-0064480
Oct. 6, 2008 (KR) .................. 10-2008-0097623

(51) Int. Cl.
| | |
|---|---|
| H04W 24/00 | (2009.01) |
| H04W 68/00 | (2009.01) |
| H04W 8/26 | (2009.01) |
| H04W 12/02 | (2009.01) |

(Continued)

(52) U.S. Cl.
CPC ............ *H04W 8/26* (2013.01); *H04W 60/06* (2013.01); *H04W 12/02* (2013.01); *H04W 68/005* (2013.01); *H04L 63/0414* (2013.01)

(58) Field of Classification Search
USPC ............ 455/414.2, 406, 456.1, 456.5, 458, 455/412.1, 515
See application file for complete search history.

(56) References Cited

U.S. PATENT DOCUMENTS

| | | | | |
|---|---|---|---|---|
| 6,253,074 | B1* | 6/2001 | Carlsson et al. | ........... 455/414.2 |
| 2003/0177267 | A1* | 9/2003 | Orava et al. | .................. 709/245 |

(Continued)

FOREIGN PATENT DOCUMENTS

| | | |
|---|---|---|
| CN | 1941990 | 4/2007 |
| CN | 1998259 | 7/2007 |

(Continued)

OTHER PUBLICATIONS

The State Intellectual Property Office of the People's Republic of China Application Serial No. 200980125945.3, Office Action dated Apr. 18, 2013, 4 pages.

(Continued)

*Primary Examiner* — Kent Chang
*Assistant Examiner* — William Lu
(74) *Attorney, Agent, or Firm* — Lee, Hong, Degerman, Kang & Waimey

(57) ABSTRACT

A method of providing location privacy of a mobile station in a wireless access system is disclosed. The method of providing location privacy of a mobile station comprises the steps of transmitting a deregistration request message to a serving base station, the deregistration message requesting entry to an idle mode; and receiving a deregistration command message from the serving base station, the deregistration command message including a temporary identifier allocated to the mobile station. In this case, the temporary identifier is an identifier for uniquely identifying the mobile station from a paging group to which the serving base station belongs.

9 Claims, 7 Drawing Sheets

(51) Int. Cl.
*H04L 29/06* (2006.01)
*H04W 60/06* (2009.01)

(56) References Cited

U.S. PATENT DOCUMENTS

| | | | | |
|---|---|---|---|---|
| 2003/0228872 | A1* | 12/2003 | Cervera et al. | 455/456.1 |
| 2005/0181805 | A1* | 8/2005 | Gallagher | 455/456.1 |
| 2005/0192011 | A1* | 9/2005 | Hong et al. | 455/440 |
| 2005/0250474 | A1* | 11/2005 | Hong et al. | 455/411 |
| 2005/0282562 | A1* | 12/2005 | Lee et al. | 455/458 |
| 2006/0009242 | A1 | 1/2006 | Ryu et al. | |
| 2006/0014550 | A1* | 1/2006 | Ryu et al. | 455/458 |
| 2006/0068762 | A1* | 3/2006 | Baldwin et al. | 455/412.1 |
| 2007/0155397 | A1* | 7/2007 | Park et al. | 455/453 |
| 2007/0211744 | A1* | 9/2007 | Crocker et al. | 370/431 |
| 2007/0291750 | A1* | 12/2007 | Nylander et al. | 370/389 |
| 2008/0013492 | A1 | 1/2008 | Lee et al. | |
| 2008/0014882 | A1* | 1/2008 | Tsai et al. | 455/187.1 |
| 2008/0037515 | A1* | 2/2008 | Sander | 370/352 |
| 2009/0305666 | A1* | 12/2009 | Tian et al. | 455/410 |

FOREIGN PATENT DOCUMENTS

| | | |
|---|---|---|
| EP | 1841269 | 10/2007 |
| JP | 2004194015 | 7/2004 |
| JP | 2004221759 | 8/2004 |
| JP | 2008503976 | 2/2008 |
| JP | 2008503977 | 2/2008 |
| KR | 1020060102771 | 9/2006 |
| KR | 1020070040717 | 4/2007 |
| WO | 2005/120178 | 12/2005 |
| WO | 2008/008688 | 1/2008 |

OTHER PUBLICATIONS

European Patent Office Application Serial No. 09773756.3, Search Report dated May 30, 2014, 6 pages.

* cited by examiner

METHOD OF PROVIDING LOCATION PRIVACY

CROSS-REFERENCE TO RELATED APPLICATIONS

This application claims the benefit of earlier filing date and right of priority to Korean Patent Applications No. 10-2008-0064480, filed on Jul. 3, 2008, and No. 10-2008-0097623, filed on Oct. 6, 2008, and also claims the benefit of U.S. Provisional Application Ser. No. 61/080,696, filed on Jul. 15, 2008, the contents of all of which are hereby incorporated by reference herein in their entirety.

BACKGROUND OF THE INVENTION

1. Field of the Invention

The present invention relates to a method of providing security of a mobile station in a wireless access system.

2. Discussion of the Related Art

Hereinafter, a paging group and an idle mode of a mobile station, which are related to the embodiments of the present invention, will be described in brief.

FIG. 1 is a diagram illustrating an example of a paging group comprised of a plurality of base stations.

As illustrated in FIG. 1, a plurality of base stations (BS) which support an idle mode belong to a paging group to constitute a paging region.

At this time, the paging group represents a logical group. The paging group is to provide a neighboring range region that can be paged to a downlink (DL) if there is any traffic targeting a mobile station (MS). Preferably, the paging group fulfils a condition that a specific mobile station should be great enough to exist for most of time within the same paging group and should be small enough to maintain a proper level of paging load.

FIG. 1 illustrates four paging groups defined in multiple base stations located in hexagonal lattices. One base station can be included in one or more paging groups. The paging group is defined by a management system. A paging group-action backbone network message can be used in the paging group. Also, a paging controller can manage a list of mobile stations which are in an idle mode, using a paging-announce message which is one of the backbone network message, and can manage initial paging of all base stations belonging to the paging group.

The idle mode means a support operation that allows a mobile station to periodically perform downlink broadcast traffic transmission even though the mobile station is not subscribed to a specific base station when moving a wireless link condition of multiple base stations.

The mobile station can be benefited by the idle mode as action requirements related to handover and general operation requirements are removed in the idle mode. The idle mode can save the power and management resources used by the mobile station by limiting action of the mobile station so as to scan radio resources during a discrete period.

Furthermore, the idle mode provides a simple and proper mode that can notify the mobile station of downlink traffic which is pending. The idle mode can provide benefit to a network and a base station by removing a wireless interface and network handover (HO) traffic from the mobile station which is not active.

SUMMARY OF THE INVENTION

As described above, a wireless network provides an idle mode action to a mobile station to save the power of the mobile station and enable efficient data reception.

However, according to a general security mode, a problem occurs in that privacy requirements of a MAC address of the mobile station are not considered during a ranging procedure performed for location update or network re-entry of the mobile station.

Accordingly, the present invention is directed to method of providing location privacy, which substantially obviates one or more of the problems due to limitations and disadvantages of the related art.

An object of the present invention is to provide a method of providing location privacy, which can effectively be used in a wireless access system.

Another object of the present invention is to provide a method of providing location privacy, which prevents security threat where a MAC address of a mobile station is transmitted from a paging message without any protection.

Still another object of the present invention is to provide a method of providing location privacy, in which a paging controller allocates a paging identifier (or paging mobile station identifier) to a mobile station to prevent a MAC address of a mobile station from being exposed on an air interface.

Further still another object of the present invention is to provide a method of allocating a temporary identifier that can uniquely identify a mobile station when the mobile station enters an idle mode or a network, reenters the network, and performs location update.

Further still another object of the present invention is to provide a method of updating a temporary identifier for uniquely identifying a mobile station of an idle mode when the mobile station performs location update.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, the present invention discloses various methods of supporting location privacy of a mobile station in a wireless access system.

In the first aspect of the present invention, a method of providing location privacy of a mobile station comprises the steps of transmitting a request message requesting a paging mobile station identifier for supporting location privacy of the mobile station; and receiving a response message including a paging identifier (or paging mobile station identifier). At this time, the paging identifier is mapped with a media access control (MAC) address of the mobile station, and is allocated form a medium which manages a paging region.

Also, according to the first aspect of the present invention, the method further comprises the step of transmitting a ranging request message including a paging identifier to perform a location update procedure. At this time, this method further comprises the step of receiving a ranging response message including one or more of new paging identifier and new paging group identifier.

Also, according to the first aspect of the present invention, the method further comprises the step of transmitting a ranging request message for performing a network reentry procedure in the mobile station. At this time, the ranging request message preferably includes a paging identifier.

Also, according to the first aspect of the present invention, the method further comprises the step of receiving a ranging response message including handover optimization information required for a network reentry procedure. The ranging response message can be generated from the target base station using a MAC address of the mobile station, which is mapped with a paging identifier by a paging controller.

In the second aspect of the present invention, a method of providing location privacy of a mobile station comprises the steps of receiving a request message requesting a paging identifier for supporting location privacy of the mobile station; and transmitting a response message to the mobile station, the response message including a paging identifier. At this time, the paging identifier is allocated from a medium which manages a paging region.

Also, according to the second aspect of the present invention, the method further comprises the step of receiving a ranging request message including a paging identifier from the mobile station. At this time, the ranging request message is transmitted to perform a location update procedure or a network reentry procedure.

Also, according to the second aspect of the present invention, the method further comprises the step of transmitting a ranging response message including one or more of new paging identifier and new paging group identifier.

In the third aspect of the present invention, a method of providing location privacy of a mobile station from a paging controller comprises the steps of receiving a request message including a media access control (MAC) address of the mobile station; mapping the MAC address of the mobile station with a paging identifier to be allocated to the mobile station; and transmitting a response message including a paging identifier.

Also, according to the third aspect of the present invention, the method further comprises the step of receiving a back-bone message including updated location information of the mobile station. At this time, the back-bone message is transmitted from a target base station.

Also, according to the third aspect of the present invention, the method further comprises the step of receiving a back-bone message including a paging identifier and transmitting a back-bone message including a MAC address of the mobile station, the MAC address being mapped with a paging identifier. At this time, the back-bone message further includes a changed paging group identifier.

In the fourth aspect of the present invention, a method of providing location privacy of a mobile station comprises the steps of transmitting a deregistration request message to a serving base station, the deregistration message requesting entry to an idle mode; and receiving a deregistration command message from the serving base station, the deregistration command message including a temporary identifier allocated to the mobile station. In this case, the temporary identifier is an identifier for uniquely identifying the mobile station from a paging group to which the serving base station belongs.

According to the fourth aspect of the present invention, the method further comprises the steps of transmitting a ranging request message to the serving base station so that the mobile station performs a location update procedure with the serving base station, the ranging request message including the temporary identifier; and receiving a ranging response message from the serving base station, the ranging response message including the temporary identifier. At this time, the temporary identifier is mapped with a media access control (MAC) address of the mobile station.

According to the fourth aspect of the present invention, the location update procedure is one of paging group location update, timer based location update, and power down location update and is performed if each start condition is fulfilled.

According to the fourth aspect of the present invention, the method further comprises the steps of transmitting a ranging request message to the serving base station so that the mobile station performs a network reentry procedure with the serving base station, the ranging request message including the temporary identifier; and receiving a ranging response message from the serving base station, the ranging response message including the temporary identifier.

According to the fourth aspect of the present invention, the method further comprises the step of receiving a paging message from the serving base station, the paging message including a temporary identifier.

In the fifth aspect of the present invention, a method of providing location privacy of a mobile station of an idle mode comprises the steps of transmitting a ranging request message to a first base station so that the mobile station performs a location update procedure in a cell region of the first base station, the ranging request message including a first temporary identifier; and receiving a ranging response message from the first base station, the ranging response message including a second temporary identifier. In this case, the second temporary identifier is an identifier for uniquely identifying the mobile station from a paging group to which the second base station belongs.

According to the fifth aspect of the present invention, the first temporary identifier is allocated from the second base station which is a serving base station, when the mobile station enters an idle mode. If the first base station and the second base station belong to the same paging group, the second temporary identifier is the same as the first temporary identifier, and if the first base station and the second base station belong to different paging groups, the second temporary identifier is different from the first temporary identifier.

According to the fifth aspect of the present invention, the ranging response message further includes a paging group identifier of a paging group to which the second base station belongs.

In the sixth aspect of the present invention, a method of providing location privacy of a mobile station comprises the steps of receiving a deregistration request message from the mobile station, the deregistration message requesting entry to an idle mode; and transmitting a deregistration command message to the mobile station, the deregistration command message including a temporary identifier allocated to the mobile station. In this case, the temporary identifier is an identifier for uniquely identifying the mobile station from a paging group to which a base station belongs.

According to the sixth aspect of the present invention, the serving base station can perform a location update procedure with the mobile station. Namely, the method further comprises the steps of receiving a ranging request message from the mobile station so as to perform a location update procedure with the mobile station, the ranging request message including the temporary identifier; and transmitting a ranging response message to the mobile station, the ranging response message including the temporary identifier. In this case, the temporary identifier is mapped with a media access control (MAC) address of the mobile station.

According to the sixth aspect of the present invention, the location update procedure is performed if one of paging group location update, timer based location update, and power down location update is fulfilled.

Also, according to the fourth aspect of the present invention, the method further comprises the steps of receiving a ranging request message from the mobile station so as to perform a network reentry procedure with the mobile station, the ranging request message including the temporary identifier; and transmitting a ranging response message to the mobile station, the ranging response message including the temporary identifier.

According to the embodiments of the present invention, the following effects and/or advantages can be obtained.

First of all, it is possible to provide an effective security method on a wireless access system.

Second, it is possible to protect a MAC address of a mobile station in accordance with the embodiments of the present invention. Also, it is possible to prevent security threat of the mobile station by protecting the MAC address of the mobile station.

Third, since a paging controller allocates a paging identifier to the mobile station, wherein the paging identifier is temporarily used to protect the MAC address of the mobile station, it is possible to prevent the MAC address of the mobile station from being exposed on an air interface. Accordingly, it is possible to support location privacy of the mobile station.

Fourth, since a temporary identifier that can uniquely identify a mobile station is allocated to the mobile station when the mobile station enters an idle mode or a network, reenters the network, and performs location update, it is possible to effectively protect location privacy of the mobile station of the idle mode.

Finally, when the mobile station of the idle mode performs location update, the mobile station updates the temporary identifier for uniquely identifying the mobile station of the idle mode, whereby location privacy of the mobile station can be protected continuously.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
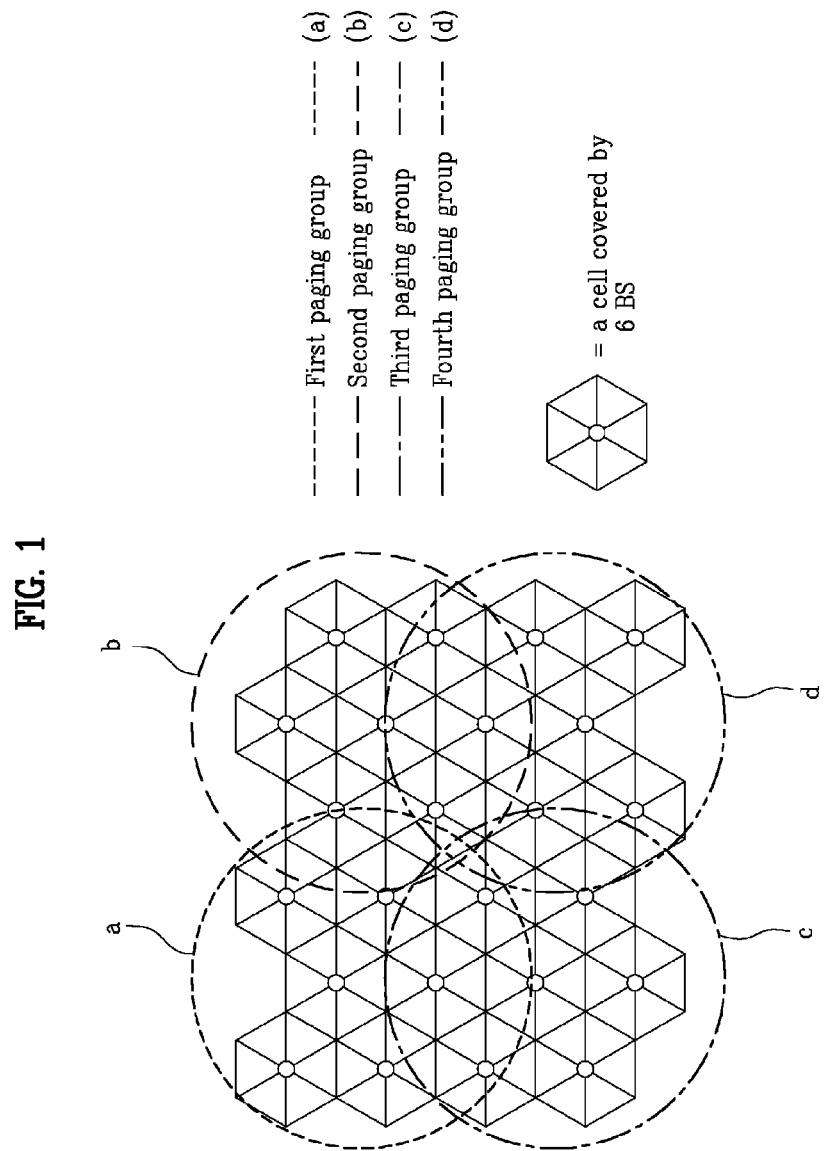
FIG. 1 is a diagram illustrating an example of a paging group comprised of a plurality of base stations.

Hereinafter, preferred embodiments of the present invention will be described in detail with reference to the annexed drawings. The detailed description, which will be given below with reference to the accompanying drawings, is intended to explain exemplary embodiments of the present invention, rather than to show the only embodiments that can be implemented according to the invention.

The following description provides specific details for a thorough understanding of embodiments of the invention. However, one skilled in the art will understand that the invention may be practiced without these details. In other instances, well-known structures and functions have not been described in detail or may be shown in block diagram form to avoid unnecessarily obscuring the description of embodiments of the invention. Wherever possible, the same reference numbers will be used throughout the drawings to refer to the same or like parts.

The present invention relates to various methods of providing security of a mobile station in a wireless access system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will be omitted, and procedures or steps equivalent to the range that can be understood by those skilled in the art will be omitted.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), advanced base station (ABS), and access point. Also, the mobile station may be replaced with terms such as a user equipment (UE), a mobile terminal (MT), a mobile subscriber station (MSS), a subscriber station (SS), and advanced mobile station (AMS).

Furthermore, a transmitter means a node that transmits data service or voice service, and a receiver means a node that receives data service or voice service. Accordingly, in an uplink, the mobile station could be a transmitter, and the base station could be a receiver. Likewise, in a downlink, the mobile station could be a receiver, and the base station could be a transmitter.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments according to the present invention can be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, or 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

For example, since a paging identifier (P_ID) according to the embodiments of the present invention are temporarily used to prevent a MAC address of a mobile station from being exposed, a paging mobile station identifier (paging MS ID) or a temporary identifier can be used to refer to the same or like parts.

In the embodiments of the present invention, the paging identifier (P_ID) represents a temporary identifier that uniquely identifies a mobile station of an idle mode from a specific paging group. Namely, the paging identifier is different from a paging group identifier (PG-ID) that identifies a paging group.

In addition, the temporary identifier is assigned to uniquely identify the mobile station (AMS) in the idle mode in a particular paging group. The AMS's temporary identifier remains valid as long as the mobile station stays in the same paging group.

Hereinafter, location update will be described in brief.

A mobile station (MS) which is in an idle mode can perform a location update procedure if several location update start conditions are fulfilled. For example, examples of the location update start conditions include paging group location update, timer based location update, power down location update, and MAC hash skip threshold update.

The mobile station can perform a paging group location update procedure if a paging group is changed. The mobile station can detect a change of the paging group by monitoring a paging group identifier (PG-ID) transmitted from a base station preferred by a DCD message or MOB_PAG-ADV broadcast message for a mobile station paging listening interval.

If the detected PG-ID does not correspond to a paging group to which the mobile station belongs, the mobile station can recognize that the paging group has been changed.

The mobile station can periodically perform a location update procedure before an idle mode timer expires. This will be referred to as timer based location update.

The mobile station tries to complete location update as one part of power down location update. When the power is stopped through a power down mechanism, a paging controller updates the exact status of the mobile station and deletes all kinds of information of the mobile station, and stops idle mode paging controlling for the mobile station. If the power down update is successfully completed, the paging controller should release all kinds of idle mode retaining information related to the mobile station. This will be referred to as power down location update.

The mobile station should perform a location update procedure if a MAC hash skip counter continuously exceeds a MAC hash skip threshold value. After successfully performing location update, the base station and the mobile station can again reset their own MAC hash skip counter. This will be referred to as MAC hash skip threshold update.

The mobile station of the idle mode can decide to update its location in accordance with security association (SA) shared with a target base station. If the mobile station decides to update its location, the mobile station can perform location update in accordance with a secure location update process or an un-secure location update process.

Figure 2:
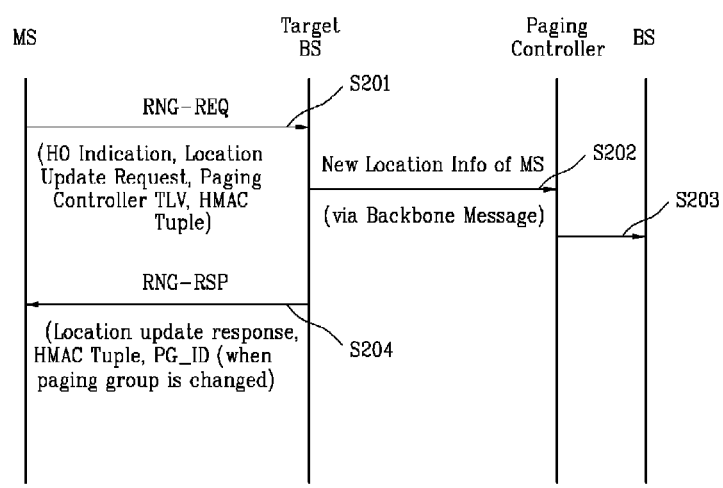
FIG. 2 is a diagram illustrating an initial ranging procedure when a mobile station wakes up from an idle mode and performs location update.

FIG. 2 is a diagram illustrating an initial ranging procedure when a mobile station wakes up from an idle mode and performs location update.

Referring to FIG. 2, the mobile station transmits a ranging request (RNG-REQ) message to a target base station (TBS), wherein the ranging request message includes a MAC address which is an identifier of the mobile station (S201).

In step S201, the ranging request message includes handover (HO) indicator, location update request, paging control TLV, and HMAC tuple information.

If the RNG-REQ message is received from the mobile station, the target base station transmits a back-bone message to the paging controller, wherein the back-bone message includes new location information of the mobile station (S202).

Also, the paging controller notifies base stations included in its paging group of new location information of the mobile station (S203).

If the target base station can supply HMAC/CMAC tuple included in the ranging request message to the mobile station, the target base station transmits a ranging response message to the mobile station to complete location update with the mobile station, wherein the ranging response message includes location update response information and HMAC tuple information. At this time, the paging group to which the mobile station belongs is changed, the target base station transmits the ranging response message, which further includes the changed paging group identifier (PG-ID), to the mobile station (S204).

In FIG. 2, when transmitting and receiving the ranging request message and the ranging response message, the mobile station and the base station transmits the MAC address of the mobile station to an air interface without any protection. In this case, security threat may occur in that location information of the mobile station may be exposed to an illegal attacker.

Figure 3:
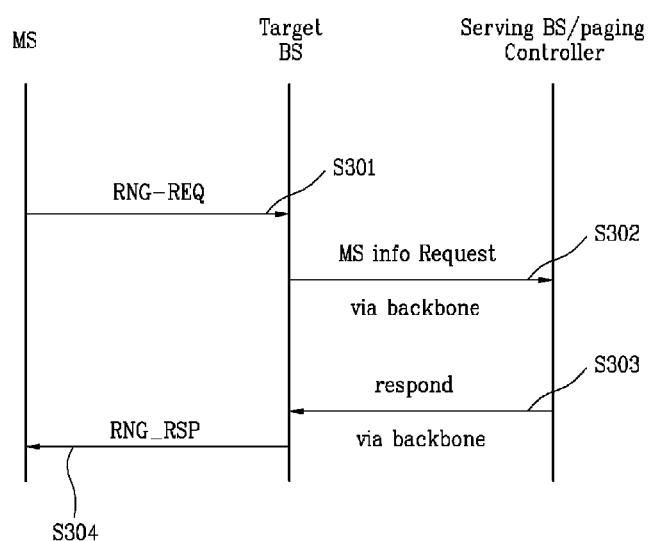
FIG. 3 is a diagram illustrating an initial ranging procedure when a mobile station of an idle mode reenters a network.

FIG. 3 is a diagram illustrating an initial ranging procedure when a mobile station of an idle mode reenters a network.

If the mobile station (MS) shares effective security context with the target base station, the mobile station can initiate a network reentry procedure by transmitting a ranging request (RNG-REQ) message, which includes effective HMAC/CMAC tuple, to the target base station (S301).

In step S301, the ranging request message further includes a ranging purpose indication TLV and a paging controller identifier TLV.

If the mobile station moves from a cell region of a serving base station to a cell region of a target base station, the target base station may not know security information of the mobile station. In this case, the target base station can request the paging controller of security information of the mobile station through a back-bone network. At this time, the paging controller may be the same entity as the serving base station or a separate entity from the serving base station. If the paging controller is different from the serving base station, the paging controller can request the serving base station of security information of the mobile station (S302).

The paging controller can notify the target base station of security information of the mobile station through the back-bone network in response to the request of the target base station (S303).

The target base station can acquire service and management context information of the mobile station through the paging controller. Accordingly, the target base station can transmit the ranging response message to the mobile station (MS), wherein the ranging response message commands the mobile station (MS) to try network reentry in the idle mode (S304).

In FIG. 3, if the mobile station (MS) of the idle mode performs the network reentry procedure, the MAC address of the mobile station (MS) can be transmitted to the target base station through an air interface without any protection. In this case, security threat having no location privacy of the mobile station may exist. In case of the network reentry procedure of FIG. 3, since the target base station does not retain the information of the mobile station, the target base station should request the paging controller of the information of the corresponding mobile station.

Hereinafter, a method of protecting the MAC address of the mobile station during a ranging procedure performed for location update, network entry, and network reentry will be described.

Location privacy means security of active and passive attacks of an attacker against user identifier and mobile station identifier. Namely, location privacy includes a simple defense of wiretapping on user identifier and mobile station identifier exchanged between the network and the mobile station, and various defenses using the simple defense of wiretapping.

The ill-intentioned attacker can pretend a normal mobile station by acquiring the MAC address of the mobile station. Accordingly, requirements of location privacy of a user (or mobile station) should necessarily be considered. Namely, solutions that can prevent the MAC address of the mobile station from being exposed to the ill-intentioned attacker without serious load to the network are required. In this regard, the following embodiments suggest a method for protecting a MAC address of a mobile station when the mobile station performs a ranging procedure for location update, initial network entry and network reentry.

Allocation of a temporary identifier for initial ranging during location update requires network action similar to allocation of a temporary identifier for initial ranging during initialization. Accordingly, a method of allocating an additional temporary identifier (for example, paging identifier (paging ID) for identifying a specific mobile station, which enters an idle mode, from a specific paging group will hereinafter be described in detail. Through this method, when the mobile station performs location update by terminating the idle mode, the mobile station can prevent its MAC address from being exposed by using a temporary identifier, i.e., paging identifier (P_ID).

Figure 4:
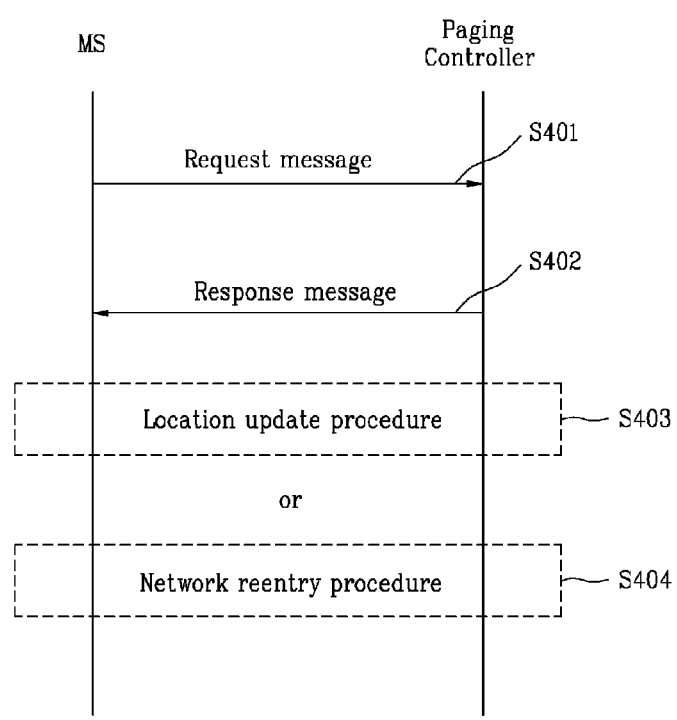
FIG. 4 is a diagram illustrating a method of allocating a paging identifier to a mobile station when the mobile station enters an idle mode, in accordance with one embodiment of the present invention.

FIG. 4 is a diagram illustrating a method of allocating a paging identifier to a mobile station when the mobile station enters an idle mode in accordance with one embodiment of the present invention.

The mobile station (MS) can be allocated with a paging identifier from the paging controller, wherein the paging identifier is to protect location privacy (for example, MAC address) of the mobile station during a ranging procedure. For example, the mobile station (MS) can request the paging controller of a paging identifier by transmitting a predetermined request message to the paging controller (S401).

The paging controller can allocate the paging identifier, which is a temporary identifier for protecting location privacy (for example, MAC address), to the mobile station. Accordingly, paging controller can transmit a response message which includes a paging identifier to the mobile station (S402).

The mobile station (MS) and the paging controller can perform a location update procedure and a network reentry procedure using the paging identifier. Since the MAC address of the mobile station is protected by the paging identifier, location information of the mobile station can be prevented from being exposed (S403, S404).

In FIG. 4, if the mobile station terminates the idle mode after moving to a random target base station, the mobile station can perform location update with the target base station using the paging identifier. At this time, the mobile station can use the paging identifier even when receiving the paging message. Namely, the mobile station can use the paging identifier when performing location update with the paging controller. Also, the paging controller can identify the mobile station using the paging identifier.

Figure 5:
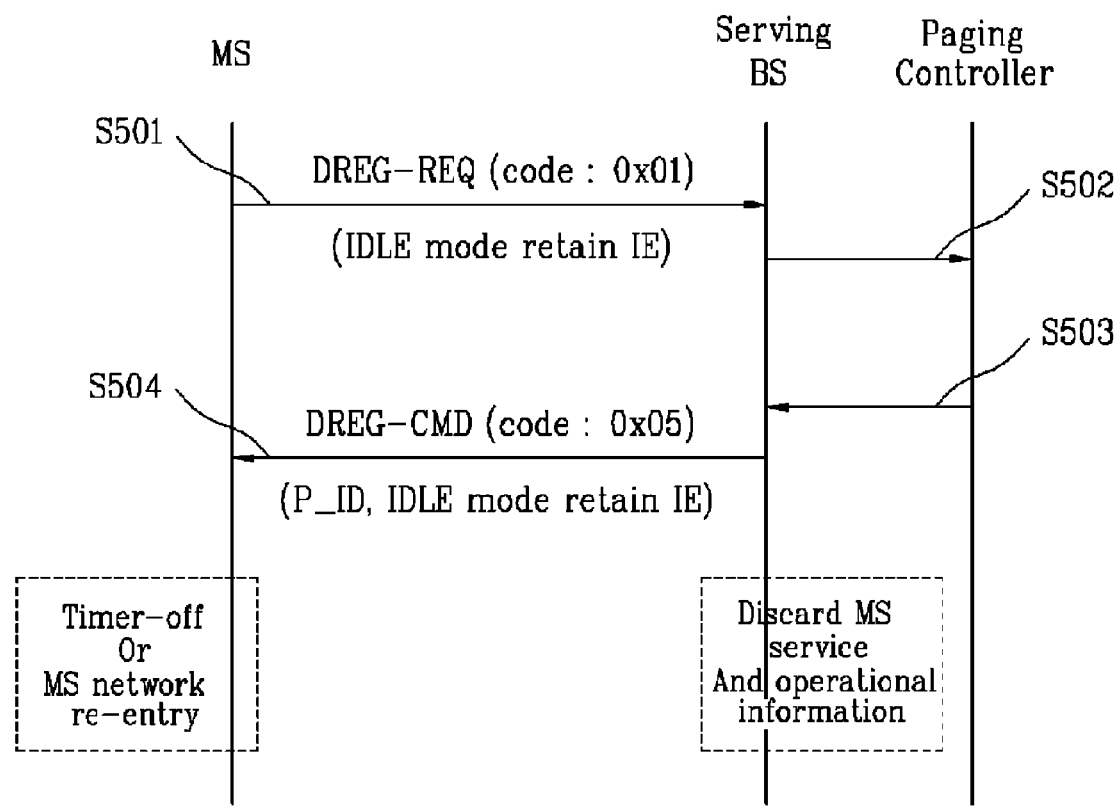
FIG. 5 is a diagram illustrating a procedure of allocating a paging identifier to a mobile station which enters an idle mode, in accordance with another embodiment of the present invention.

FIG. 5 is a diagram illustrating a procedure of allocating a paging identifier to a mobile station which enters an idle mode, in accordance with another embodiment of the present invention.

When the mobile station converts to an idle mode in a cell of a serving base station, the mobile station can be allocated with a paging identifier, which is a temporary identifier to be used in the idle mode, from the paging controller or the serving base station. In this case, a MAC address of the mobile station can be protected using a paging identifier (i.e. temporary identifier). The temporary identifier allocated to the mobile station can be maintained effectively as far as the mobile station is included in the same paging group.

Referring to FIG. 5, the mobile station can transmit a deregistration request (DREG-REQ) message to the serving base station (BS) to enter the idle mode. At this time, the deregistration request message can include idle mode retain information element (IE) (S501).

The serving base station notifies the paging controller that the mobile station enters the idle mode (S502).

The paging controller allocates a paging identifier (P_ID) which is a temporary identifier used to uniquely identify the mobile station in the idle mode in a particular paging group, and transmits a message including the paging identifier to the serving base station (S503).

The serving base station transmits a deregistration command (DREG-CMD) message so that the mobile station enters the idle mode, wherein the deregistration command message includes a paging identifier and idle mode retain information (S504).

Afterwards, the mobile station can perform location update with the serving base station using the paging identifier if a timer expires, or can perform a network reentry procedure with the serving base station using the paging identifier in a normal mode. Also, if the mobile station enters the idle mode, the serving base station can delete service information and action information of the mobile station.

Also, the mobile station can receive a paging message transmitted from the paging controller and/or the serving base station in the idle mode. At this time, the paging controller and/or the serving base station can transmit the paging message using the temporary identifier instead of the MAC address of the mobile station to protect location privacy of the mobile station.

Figure 6:
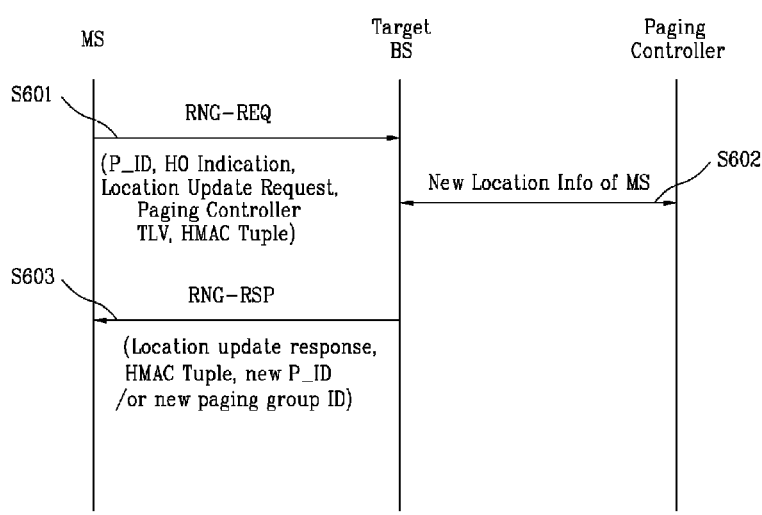
FIG. 6 is a diagram illustrating an initial ranging procedure during location privacy using a paging identifier, in accordance with still another embodiment of the present invention.

FIG. 6 is a diagram illustrating an initial ranging procedure during location privacy using a paging identifier, in accordance with still another embodiment of the present invention.

The paging controller can control the paging group which includes one or more base stations. Hereinafter, it is assumed that the serving base station (see FIG. 5) which has been requested by the mobile station in respect of entry of the idle mode and the target base station of FIG. 6 are included in the same paging group. Also, location update of FIG. 6 can be applied even in case of the aforementioned various location update start conditions.

The paging controller can retain mapping information between the temporary identifier, i.e., paging identifier (P_ID) allocated to the mobile station in FIG. 5 and the MAC address of the mobile station. If the paging controller is changed, new paging controller can acquire information related to the mobile station from the previous paging controller. Accordingly, the new paging controller can also identify the mobile station using the mapping information between the paging identifier of the mobile station and the MAC address of the mobile station.

The mobile station can perform location update when moving to the target base station. Namely, the mobile station can perform an initial ranging procedure with the target base station to perform location update. At this time, the mobile station can transmit a ranging request (RNG-REQ) message to the base station so as to perform location update, wherein the ranging request message includes paging identifier (P_ID), handover (HO) indicator, location update request parameter, paging control TLV, and HMAC tuple parameter (S601).

In step S601, the mobile station can use the paging identifier which is a temporary identifier allocated in FIG. 4 or FIG. 5. Namely, the mobile station can protect its MAC address on an air interface by using the paging identifier (i.e. temporary identifier) mapped with the MAC address instead of the MAC address itself.

Since the mobile station has entered its cell region, the target base station transfers new location information of the mobile station to the paging controller. In addition, the paging controller transfers paging information related with the mobile station. And the paging controller transfers a new paging identifier which is assigned to uniquely identify the mobile station in the idle mode in the another paging group, if the target base station is belongs to the another paging group (S602).

The target base station can transmit a ranging response (RNG-RSP) message in response to the location update request of the mobile station, wherein the ranging response message includes CMAC tuple and/or HMAC tuple, and paging identifier (or paging mobile station identifier) (S603).

If the paging group is changed as the mobile station moves in step S603, the target base station can transmit the ranging response message, which includes a temporary identifier (P_ID) for identifying the mobile station from the corresponding paging group and a paging group identifier (PG_ID) of the corresponding paging group, to the mobile station.

However, as another embodiment of the present invention, the base station can allocate the paging identifier and/or the paging group identifier to the mobile station regardless of change of the paging group. Accordingly, the base station can transmit the ranging response (RNG-RSP) message, which includes new paging identifier and/or paging group identifier (PG_ID), to the mobile station whenever performing location update with the base station.

In FIG. 6, it is assumed that the paging controller is changed. In this case, the changed paging controller transmits the ranging request message to the target base station by allocating new paging identifier (or paging mobile station identifier) to the mobile station. The target base station transmits the ranging response message, which includes new paging identifier, to the mobile station. Accordingly, if the mobile station performs initial ranging with the target base station, the mobile station can transfer the paging identifier allocated by the paging controller to new base station.

In this case, different paging controllers can allocate different paging identifiers to the mobile station. Accordingly, the mobile station can prevent the MAC address from being exposed by using one or more paging identifiers. Additionally, if the paging group is changed, the ranging response message transferred to the mobile station can include new paging group identifier (PG_ID).

Furthermore, if the mobile station moves to the target base station in the idle mode, the mobile station can receive the paging message transmitted from the paging controller and/or the target base station. At this time, the paging controller and/or the target base station can transmit the paging message using the temporary identifier instead of the MAC address of the mobile station to protect location privacy of the mobile station.

Figure 7:
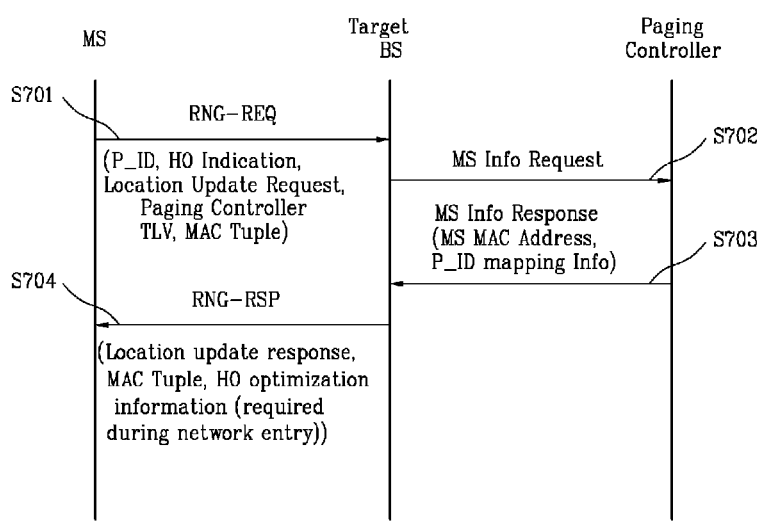
FIG. 7 is a diagram illustrating an initial ranging procedure during a network reentry procedure using a paging identifier, in accordance with further still another embodiment of the present invention.

FIG. 7 is a diagram illustrating an initial ranging procedure during a network reentry procedure using a paging identifier in accordance with further still another embodiment of the present invention.

The mobile station can use the paging identifier to perform network reentry to the target base station. Namely, the mobile station can transmit a ranging request (RNG-REQ) message to the base station, wherein the ranging request message includes paging identifier (P_ID) which is a temporary identifier, handover (HO) indicator, location update request parameter, paging control TLV, and MAC tuple (HMAC tuple and/or CMAC tuple) parameter (S701).

In step S701, the MAC address of the ranging request message transmitted from the mobile station can be protected by the paging identifier (P_ID). In this case, the paging identifier was previously allocated by a serving base station to the mobile station when the mobile station entered in the idle mode. Namely, since the MAC address of the mobile station is protected through the paging identifier (i.e. temporary identifier), the MAC address can be prevented from being exposed on the air interface.

The target base station targeted for handover does not have information of the mobile station. Accordingly, after receiving the ranging request message, which includes the paging identifier, from the mobile station, the target base station should acquire information of the MAC address of the mobile station from the paging controller. To this end, the target base station can transmit a mobile station information request message, which includes the paging identifier, to the paging controller (S702).

The paging controller can transfer the mobile station information response message to the target base station, wherein the mobile station information response message includes the MAC address of the mobile station, which is mapped with the paging identifier (P_ID) allocated to the mobile station (S703).

In step S703, the target base station can identify the MAC address of the mobile station, which is mapped with the paging identifier, by receiving the mobile station information response message. Namely, since the mapping information between the paging identifier and the MAC address of the mobile station is retained by the paging identifier, the target base station can identify the mobile station using the mapping information.

The target base station can transmit the ranging response (RNG_RSP) message to the mobile station in response to the ranging request message of the mobile station during the network reentry procedure. At this time, the ranging response message can include at least one of a location update response, a new paging identifier, a MAC tuple (for example, CMAC Tuple and/or HMAC Tuple) and handover optimization information element required for network entry (S704).

Referring to the method of FIG. 7, if the mobile station of the idle mode moves to the target base station and tries network reentry to the target base station during entry to the normal mode, the MAC address of the mobile station can be prevented from being exposed. Namely, the mobile station can protect its MAC address during network reentry process by using the paging identifier. At this time, the paging identifier can be allocated from the paging controller and/or the base station to the mobile station when the mobile station enters the idle mode or performs location update in the idle mode (see FIG. 5 and FIG. 6).

In FIG. 7, when the mobile station performs network reentry through the target base station, the mobile station can transfer the paging identifier allocated by the paging controller to the target base station. The target base station which has received the paging identifier can identify the mobile station which has transmitted the paging identifier, by using the mapping information between the MAC address of the corresponding mobile station and the paging identifier, which are received from the paging controller.

As another embodiment of the present invention, the mobile station and the base station through which the embodiments of the present invention described with reference to FIG. 4 to FIG. 7 can be performed will be described.

The mobile station can be operated as a transmitter in the uplink, and can be operated as a receiver in the downlink. Also, the base station can be operated as a receiver in the uplink, and can be operated as a transmitter in the downlink. Namely, the mobile station and the base station can include a transmitter and a receiver to transmit information or data.

The transmitter and the receiver can include processor, module, part, and/or means for performing the embodiments of the present invention. Particularly, the transmitter and the receiver can include a module (means) for encoding a message, a module for decoding the encoded message, and an antenna for transmitting and receiving the messages.

The mobile station used in the embodiments of the present invention can include a low power radio frequency (RF)/intermediate frequency (IF) module. Also, the mobile station can include a means, module or part for performing controller function, medium access control (MAC) frame variable control function according to service characteristics and radio wave condition, handover function, authentication and encryption function, packet modulation and demodulation function for data transmission, quick packet channel coding function, security functions include at least one of a means of authorization/SA control, a means of EAP encapsulation/decapsulation, a means of protecting location privacy and a means of MPDU encryption/authentication, and real-time modem control function, thereby performing the aforementioned embodiments of the present invention.

The base station can transmit data received from an upper layer to the mobile station by wireless or wire. The base station can include a low power RF/IF module. Also, the base station can include a means, module or part for performing controller function, orthogonal frequency division multiple access (OFDMA) packet scheduling, time division duplex (TDD) packet scheduling and channel multiplexing function, medium access control (MAC) frame variable control function according to service characteristics and radio wave condition, handover function, authentication and encryption function, packet modulation and demodulation function for data transmission, quick packet channel coding function, security functions include at least one of a means of authorization/SA control, a means of EAP encapsulation/de-capsulation, a means of protecting location privacy and a means of MPDU encryption/authentication, and real-time modem control function, thereby performing the aforementioned embodiments of the present invention.

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of providing location privacy of a mobile station, the method performed by the mobile station and comprising:

transmitting a deregistration request message to a first base station, the deregistration request message requesting entry to an idle mode;

receiving a deregistration command message granting the entry to the idle mode from the first base station in response to the deregistration request message, the deregistration command message including a temporary identifier;

transmitting a ranging request message to a second base station in order to perform a location update by using the temporary identifier; and receiving a ranging response message from the second base station in response to the ranging request message, wherein the temporary identifier is temporarily used to provide security of a media access control (MAC) address of the mobile station in a paging group to which the first and the second base station belong; and wherein the temporary identifier is used instead of the MAC address of the mobile station in order to protect the location privacy of the mobile station in the paging group.

2. The method of claim 1, wherein the temporary identifier is mapped with the MAC address of the mobile station.

3. The method of claim 2, wherein the location update is a paging group location update, a timer based location update, or a power down location update.

4. A method of providing location privacy of a mobile station, the method comprising:

receiving, by a first base station, a deregistration request message from the mobile station, the deregistration request message requesting entry to an idle mode;

transmitting, by the first base station, a deregistration command message granting the entry to the idle mode in response to the deregistration request message, the deregistration command message including a temporary identifier;

receiving, by a second base station from the mobile station, a ranging request message to perform a location update by using the temporary identifier; and transmitting, by the second base station to the mobile station, a ranging response message in response to the ranging request message;

wherein the temporary identifier is temporarily used to provide security of a media access control (MAC) address of the mobile station in a paging group to which the first and the second base station belong; and wherein the temporary identifier is used instead of the MAC address of the mobile station in order to protect the location privacy of the mobile station in the paging group.

5. The method of claim 4, wherein the temporary identifier is mapped with the MAC address of the mobile station.

6. The method of claim 5, wherein location update is a paging group location update, a timer based location update, or a power down location update.

7. A mobile station for supporting location privacy, the mobile station comprising:

a receiver;

a transmitter; and a processor for supporting the location privacy of the mobile station, wherein the processor is configured to:

transmit, via the transmitter, a deregistration request message to a first base station, the deregistration request message requesting entry to an idle mode;

receive, via the receiver, a deregistration command message granting the entry to the idle mode from the first base station in response to the deregistration request message, the deregistration command message including a temporary identifier;

transmit, via the transmitter, a ranging request message to a second base station in order to perform a location update by using the temporary identifier; and receive, via the receiver, a ranging response message from the second base station in response to the ranging request message;

wherein the temporary identifier is temporarily used to provide security of a media access control (MAC) address of the mobile station in a paging group to which the first and the second base station belong; and wherein the temporary identifier is used instead of the MAC address of the mobile station in order to protect the location privacy of the mobile station in the paging group.

8. The mobile station of claim 7, wherein the temporary identifier is mapped with the MAC address of the mobile station.

9. The mobile station of claim 8, wherein the processor is further configured to receive, via the receiver, the paging message from the second base station, the paging message including the temporary identifier.

* * * * *